April 6, 1965     J. D. BUCHANAN     3,176,455
ROTARY MOWER BLADE
Filed Oct. 31, 1963     2 Sheets-Sheet 1
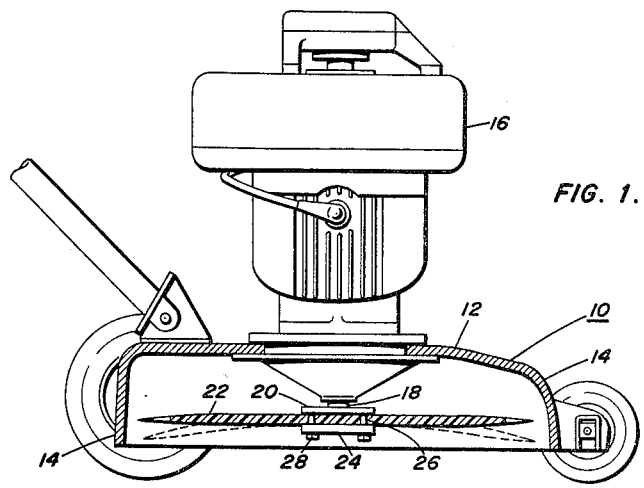
FIG. 1.
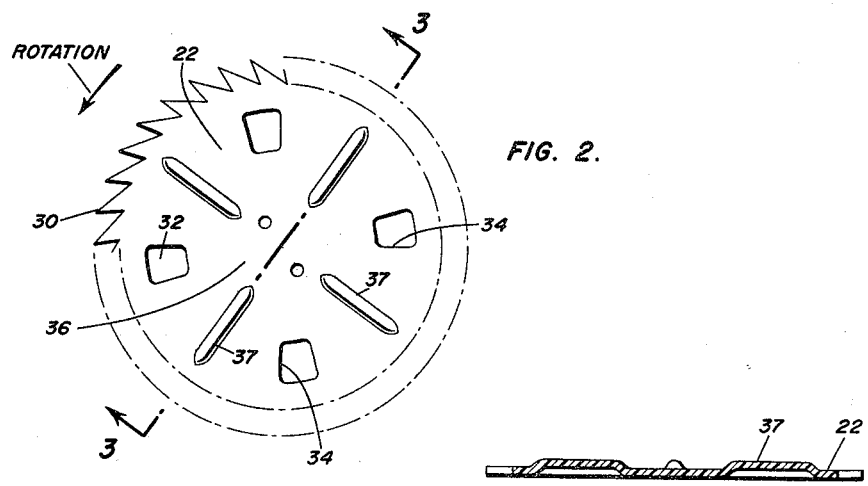
FIG. 2.
FIG. 3.
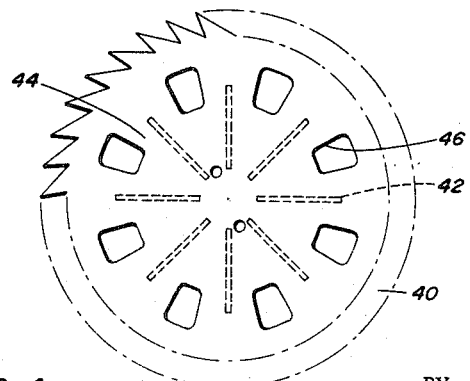
FIG. 4.
INVENTOR
JOHN D. BUCHANAN
BY
Robert C. Smith
ATTORNEY April 6, 1965 J. D. BUCHANAN 3,176,455
ROTARY MOWER BLADE Filed Oct. 31, 1963 2 Sheets-Sheet 2

INVENTOR
JOHN D. BUCHANAN

BY *Robert Smith*
ATTORNEY

United States Patent Office 3,176,455
Patented Apr. 6, 1965

3,176,455
ROTARY MOWER BLADE
John D. Buchanan, 2123 Eastridge Road, Lutherville, Md.
Filed Oct. 31, 1963, Ser. No. 320,393
9 Claims. (Cl. 56—295)

This invention relates to lawn mowers, and more specifically to a unique type of cutting blade for a rotary type lawn mower.

Powered lawn mowers have come into widespread use despite their cost and the existence of recognized hazards connected with their operation. The well known rotary type of mower is especially popular because it can be made light and easily maneuverable in relation to its size and because it is more effective than a reel type mower in cutting tall grass or weeds and in operation on uneven ground or over hills or terraces. This type of mower is especially hazardous, however, because of the speed and resulting high inertia of its blade. This creates two sources of danger: first, the blade is capable of hurling a stone or other hard object with great speed for a substantial distance; and, secondly, the possibility is always present that the operator may inadvertently maneuver the mower in such manner as to bring the blade into contact with his own feet, with resulting serious injury. It is therefore an object of the present invention to provide a mowing device which has the recognized advantages of the standard rotary lawn mower but in which the aforementioned dangers in operation are eliminated or minimized.

It is another object of the present invention to provide a cutting blade suitable for use with a rotary lawn mower which is sufficiently durable that it can be relied upon to provide good performance in normal grass-cutting operation, yet is sufficiently light and flexible that it is easily deflected in the event of a collision with a hard object.

It is another object of the present invention to provide a cutting blade for use with a rotary lawn mower in which the cutting teeth are sufficiently weak that they will break off before cutting high-density material.

It is another object of the present invention to provide a frangible cutting blade for a rotary lawn mower having sufficiently low density and thickness such that relatively little energy is available to cause parts thereof to fly away from the mower due to their own momentum should the blade fail.

It is a further object of the present invention to provide a cutting blade for a rotary lawn mower in which the low density and thinness of the blade material are such that, upon fracturing, the severed parts are sufficiently unstable aerodynamically that they will travel only a very short distance.

It is another object of the present invention to provide a cutting blade meeting the above objects which is sufficiently inexpensive to produce that even the replacement of several such blades in a season may be accomplished at comparatively little expense.

Other objects and advantages will become apparent from the following specification taken in connection with the accompanying drawings, in which:

FIGURE 1 is a view, partly in section, of a rotary power mower incorporating my invention.

FIGURE 2 is a plan view of the cutting blade shown in FIGURE 1.

FIGURE 3 is a sectional view along line 3—3 of FIGURE 2.

FIGURE 4 is a plan view of another form of cutting blade made according to my invention.

Figure 5:
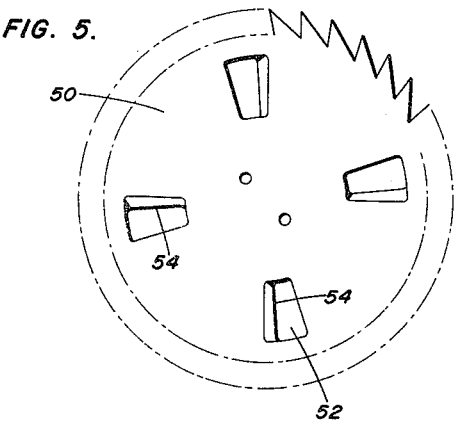
FIGURE 5 is a plan view of still another form of cutting blade made according to my invention.

Referring now to FIGURE 1, a rotary power mower is shown generally at numeral 10. It includes a platform 12 having sides 14 which act as guards. Platform 12 carries a prime mover 16 which is shown as a gasoline engine, but which may also be an electric motor. The output shaft 18 of motor 16 includes a flange 20 to which the center section of a circular cutting blade 22 is attached by means of a disc 24 having a plurality of holes 26 for receiving bolts 28 which extend into the flange 20. Cutting blade 22 is shown considerably exaggerated in thickness, since it will normally be approximately from 0.010″ to 0.020″ thick. Because of its thinness, it has a tendency to droop somewhat when at rest, as shown in the dotted outline.

Cutting blade 22 is shown in plan view in FIGURE 2. It consists of a disc of low-density material such as plastic which may be of any of several compositions. One combination which I have found to make a particularly satisfactory blade is nylon cloth reinforced with a polycarbonate plastic which is currently marketed under the trade name "Lexan." Blades made with epoxy glass cloth laminate have worked reasonably well but usually do not last so long in service as those of nylon cloth impregnated with polycarbonate plastic. The outside edge of the disc is provided with cutting teeth 30. I have found that particularly good cutting action is derived from this type of blade when the teeth 30 are approximately one-half inch long and are formed so that the cutting edge is pitched on an angle slightly in advance of a radius line. Blade 22 also includes a plurality of radially disposed openings 32, each of which includes a cutting edge 34. Each of the cutting edges 34 is also pitched slightly in advance of a radius line. This assures proper cutting action and tends to keep the grass cuttings from collecting in the openings. It is preferable that the openings 32 be shaped such that severe localized stresses are avoided. Consequently, the corners should be rounded, and a triangular shape of opening resulting in points near the center should be avoided. A plurality of mounting holes 36 are disposed near the center for engagement with bolts 28. Obviously, any suitable mounting arrangement may be used. Because of the tendency of the blade 22 of FIGURE 1 to droop when at rest, a number of upstanding ridges 37 have been included. These ridges, in addition to stiffening the structure of the blade, have a tendency to create a fanning action which draws the grass upwardly and provides a somewhat neater and more even cutting job. These ridges are also shown in FIGURE 3, which is a sectional view of the blade 22 taken along line 3—3 of FIGURE 2.

A modified form of cutting blade 40 is shown in FIGURE 4. This blade is, or may be, similar to that of FIGURE 2 except for the presence of a plurality of spring wire fingers 42 which extend radially along the spokes 44 formed between the openings 46. Depending upon the thickness of material chosen for the blade and its flexibility, the tendency of the blade to droop as shown in FIGURE 1 may or may not be of concern. Where the amount of droop is significant, it can be alleviated by molding the spring wire fingers 42 into the blade. They may also be carried by a supporting member such as the disc 24 of FIGURE 1, such that they tend to urge the blade 22 upwardly. These fingers 42 impart a substantial amount of rigidity to the blade without adding significant mass. Should the blade strike a dense object and fly apart, the fingers 42, which are light, are either retained by disc 24 or, if molded within the blade, are almost certain to be in an aerodynamically unstable piece of plastic which would not be capable of traveling any significant distance.

Figure 6:
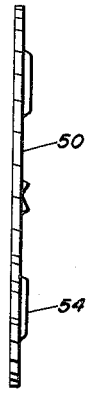
FIGURE 6 is a side or edge view of the cutting blade shown in FIGURE 5.

The cutting blade 50, shown in FIGURE 5, may also be very similar to that shown in FIGURE 2 so far as the choice of material, its thickness, and the depth and angle of the teeth are concerned. In this modification the openings 52 are cut differently from those of FIGURE 2 to permit the cutting edges 54 to be bent down slightly out of the plane of the blade 50. Because of the fanning action inherent in this arrangement, a very effective cutting action is provided along with additional stiffness for the blade which minimizes the droop referred to above when the blade is at rest. An edge view of this cutting blade is shown in FIGURE 6. The thickness of the blade and the depth of the displaced cutting edges are exaggerated somewhat to portray the configuration on the scale of the drawing.

Figure 7:
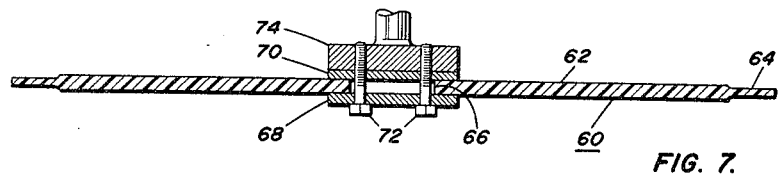
FIGURE 7 is a sectional view on an enlarged scale of still another form of cutting blade made according to my invention in association with a special mounting means for the blade.

FIGURE 7 is a sectional view of another type of cutting blade made according to my invention in association with a mounting means. In plan view it may look substantially like FIGURE 2. Another way of dealing with the droop shown in FIGURE 1 is to make the center section of the blade somewhat thicker than the edges supporting the teeth. In this embodiment, the blade 60 consists of a center section 62 and an outside section 64 which carries and includes the teeth. Because of the thickness of the center section 62, there is much less tendency for a blade of this configuration to droop than where the entire diameter is the same thickness as the outside edge 64. Typical thicknesses used are .020" to .060" for the center section and .010" to .020" for the outside section 64. This blade is shown with a fairly large central hole 66 which permits the blade to be mounted by means of a yieldable arrangement permitting it to slip somewhat when it strikes a heavy or high-density object. The blade 60 is confined between two washers 68 and 70 which receive bolts 72 threadedly engaged with a flange 74 which may be part of the mower shaft. A spring-type washer (not shown) could be inserted between the heads of bolts 72 and washer 68, if it were found desirable, to assure slipping without damage to the blade. By proper tightening of bolts 72, enough pressure is exerted on blade 60 to assure proper cutting, but not so much as would prevent some slipping of the blade between washers 68 and 70 should the blade meet an unexpectedly high resistance.

Figure 8:
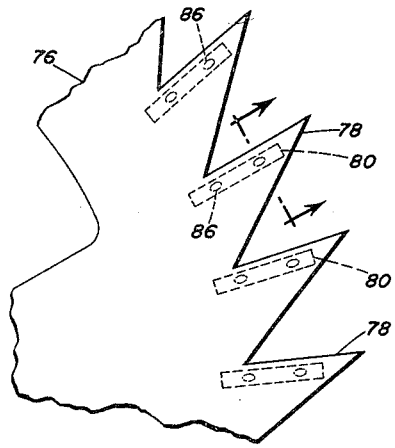
FIGURE 8 is a view of a portion of a cutting blade on an enlarged scale showing special reinforcing means for the teeth.
Figure 9:
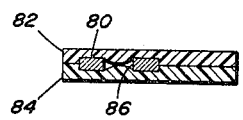
FIGURE 9 is a section taken on line 9—9 of FIGURE 8.

FIGURE 8 shows a view of a portion of a cutting blade on an enlarged scale to show special reinforcing metal inserts molded into the teeth near the cutting edges. The blade 76 carries a large number of teeth 78 on its periphery. The teeth are formed with inserts 80 of very thin metal near the cutting edges in order to reinforce the edges, thereby providing better wearing qualities for the blade. The structure may be better understood by considering FIGURE 9 which is a section, still further enlarged, taken through one of the teeth. The blade 76 includes two layers of plastic-reinforced nylon cloth 82 and 84 which are bonded together with the metal insert 80 secured therebetween. Insert 80 is formed with holes 86 to receive some of the plastic material which flows into the holes when the layers are bonded together. This aids in securing the inserts to the blade. Although the use of these inserts 80 is not required for satisfactory operation, some increase in the useful life of the blade is afforded at some increase in cost. No significant hazard is involved because the inserts are of such lightness (approximately .002" thick) that they do not appreciably affect the poor aerodynamic qualities of the teeth, should they break away as fragments. Similar inserts could obviously be placed in the cutting edges of the openings, if desired.

While only a limited number of embodiments have been shown and described herein, these are to be considered as exemplary only, and numerous modifications may be made within the scope of the present invention which is to be limited only by the scope of the following claims.

I claim:

1. For use with a grass-cutting machine of the rotary type including a carriage and a prime mover mounted on said carriage, a cutting element driven by said prime mover comprising a blade of substantially circular configuration, said blade being made of a nylon cloth reinforced with a polycarbonate plastic being between .010 and .060 inch in thickness and having a plurality of cutting teeth formed along its edge, the cutting edge of each of said teeth extending along a line in advance of a radius through its root, and said teeth being not less than approximately one-half inch deep, said blade also having a plurality of openings inside the radius of the roots of said cutting teeth, each of said openings also having a cutting edge extending along a line in advance of a radius through its inner edge.

2. A cutting element for a grass-cutting machine as set forth in claim 1 wherein said blade is of substantially greater thickness over a part of its radius than at its periphery to minimize deformation of the blade under its own weight while at rest.

3. A cutting member for a rotary lawn mower comprising a blade of plastic reinforced fabric material of generally circular configuration and having cutting teeth arranged on its periphery, said blade being between .010 and .060 inch in thickness whereby it is easily deflected in case of suffering a glancing blow with an object having substantial mass and easily frangible in case of striking an object of substantial mass with such directness as to preclude deflection.

4. A cutting member for a rotary lawn mower as set forth in claim 3 wherein said blade also includes means defining a plurality of holes having cutting edges and the cutting edges of said holes and said teeth are formed to extend along a line in advance of a radius running through their innermost portions.

5. A cutting member for a rotary lawn mower as set forth in claim 3 wherein said blade is formed of two layers of resin-impregnated material and thin metal inserts are positioned adjacent the edges of said cutting teeth between said layers.

6. A cutting member for a rotary lawn mower as set forth in claim 3 wherein a plurality of thin resilient supporting arms are included which extend substantially along radii of said blade for a part of the distance between the center of said blade and an edge thereof.

7. A cutting member for a rotary lawn mower comprising a blade of plastic reinforced fabric material of generally circular configuration and having cutting teeth arranged on its periphery, said blade being between .020 and .060 inch in thickness whereby it is easily frangible in case of collision with any body of substantial mass and wherein the cutting edges of said teeth are formed to extend along a line in advance of a radius running through their innermost portions.

8. A cutting blade for a rotary lawn mower as set forth in claim 7 wherein the fragments of said blade resulting from a collision are of such light weight as to be aerodynamically unstable.

9. A cutting blade for a rotary lawn mower as set forth in claim 7 wherein said blade includes means defining a plurality of holes having cutting edges and said cutting edges are formed slightly out of the plane of said blade.

References Cited by the Examiner

UNITED STATES PATENTS

| | | | |
|---|---|---|---|
| 255,913 | 4/82 | Beckwith | 56—295 |
| 2,837,887 | 6/58 | Hansen | 56—295 |
| 2,854,807 | 10/58 | Byler et al. | 56—295 |
| 3,097,469 | 7/63 | Belfiore | 56—295 |

T. GRAHAM CRAVER, *Primary Examiner.*
ANTONIO F. GUIDA, *Examiner.*